US006980217B1

(12) United States Patent
Pether

(10) Patent No.: US 6,980,217 B1
(45) Date of Patent: Dec. 27, 2005

(54) INTEGRATION OF VIDEO PROCESSING INTO A BLOCK MOVE ENGINE

(75) Inventor: David N. Pether, Wokingham (GB)

(73) Assignee: LSI Logic Corporation, Milpitas, CA (US)

( * ) Notice: Subject to any disclaimer, the term of this patent is extended or adjusted under 35 U.S.C. 154(b) by 239 days.

(21) Appl. No.: 09/960,771

(22) Filed: Sep. 21, 2001

(51) Int. Cl.[7] .............................................. G09G 5/37
(52) U.S. Cl. ....................... 345/561; 345/629; 345/634; 345/638; 345/641
(58) Field of Search ................................. 345/561, 562, 345/629, 634, 136, 137, 563, 546, 547, 638, 345/641, 565; 348/239

(56) References Cited

U.S. PATENT DOCUMENTS

| | | | | |
|---|---|---|---|---|
| 5,835,729 A | * | 11/1998 | Moreton et al. | 709/246 |
| 5,912,710 A | * | 6/1999 | Fujimoto | 348/445 |
| 6,181,711 B1 | * | 1/2001 | Zhang et al. | 370/538 |
| 6,198,477 B1 | * | 3/2001 | Kurtze et al. | 715/500.1 |
| 6,208,354 B1 | * | 3/2001 | Porter | 345/634 |

OTHER PUBLICATIONS

"Video Sampling Structure Conversion in BMME" (00-336) U.S. Appl. No. 09/960,578; Filed Sep. 21, 2001; Inventor David N. Pether.
"Block Move Engine With Macroblock Addressing Modes" (00-337) U.S. Appl. No. 09/878,594; Filed Jun. 11, 2001; Inventor David N. Pether and Martin J. Ratcliffe.
"Block Move Engine With Gamma and Color Conversions" (00-338) U.S. Appl. No. 09/960,572; Filed Sep. 21, 2001; Inventor David N. Pether and Ivan M. DiPrima.
"Block Move Engine With Scaling and/or Filtering for Video or Graphics"; U.S. Appl. No. 09/900,940; Filed Jul. 9, 2001 (00-339); Inventor David N. Pether.
"Barrel Shift for Graphics Data Re-Alignment and Expansion" (00-341) U.S. Appl. No. 09/882,971; Filed Jun. 15, 2001; Inventors David N. Pether and Gregor J. Martin.

* cited by examiner

*Primary Examiner*—Matthew C. Bella
*Assistant Examiner*—Hau Nguyen
(74) *Attorney, Agent, or Firm*—Christopher P. Maiorana, P.C.

(57) ABSTRACT

An apparatus comprising a data modification circuit and a composite circuit. The data modification circuit may be configured to generate a first output data stream in response to a first one or more of the data streams. The composite circuit may be configured to generate a combined output data stream in response to the first output data stream and remaining data streams.

19 Claims, 3 Drawing Sheets

INTEGRATION OF VIDEO PROCESSING INTO A BLOCK MOVE ENGINE

CROSS REFERENCE TO RELATED APPLICATIONS

The present application may relate to co-pending application Ser. No. 09/900,940, filed Jul. 9, 2001, Ser. No. 09/882,971, filed Jun. 15, 2001, Ser. No. 09/878,594, filed Jun. 11, 2001, Ser. No. 09/960,578, filed Sep. 21, 2001, and Ser. No. 09/960,572, filed Sep. 21, 2001, which are each hereby incorporated by reference in their entirety.

FIELD OF THE INVENTION

The present invention relates to a method and/or architecture for video processing generally, and more particularly to a method and/or architecture for integrating video and graphics processing in a single processor.

BACKGROUND OF THE INVENTION

The implementation of a block move engine (BME) (a bit blitter or blitting engine) for rapidly copying blocks of graphics data from one location in memory to another is generally used for graphics processing. BMEs may be extended to include two input data streams of identical size, which are combined by a logical composition operation and written back to memory as a single data block. The demand for improvements in graphics speed and resolution and the convergence of video and graphics applications onto common platforms has made it is desirable to incorporate a wider selection of functions within the general structure of a BME.

SUMMARY OF THE INVENTION

The present invention provides an apparatus comprising a data modification circuit and a composite circuit. The data modification circuit may be configured to generate a first output data stream in response to a first one or more of the data streams. The composite circuit may be configured to generate a combined output data stream in response to the first data stream and remaining data streams.

The objects, features and advantages of the present invention include providing a method and/or architecture for implementing a block move engine (BME) that may (i) read any graphics or video objects, (ii) manipulate and combine the objects and/or (iii) write the results into a memory.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Figure 1:
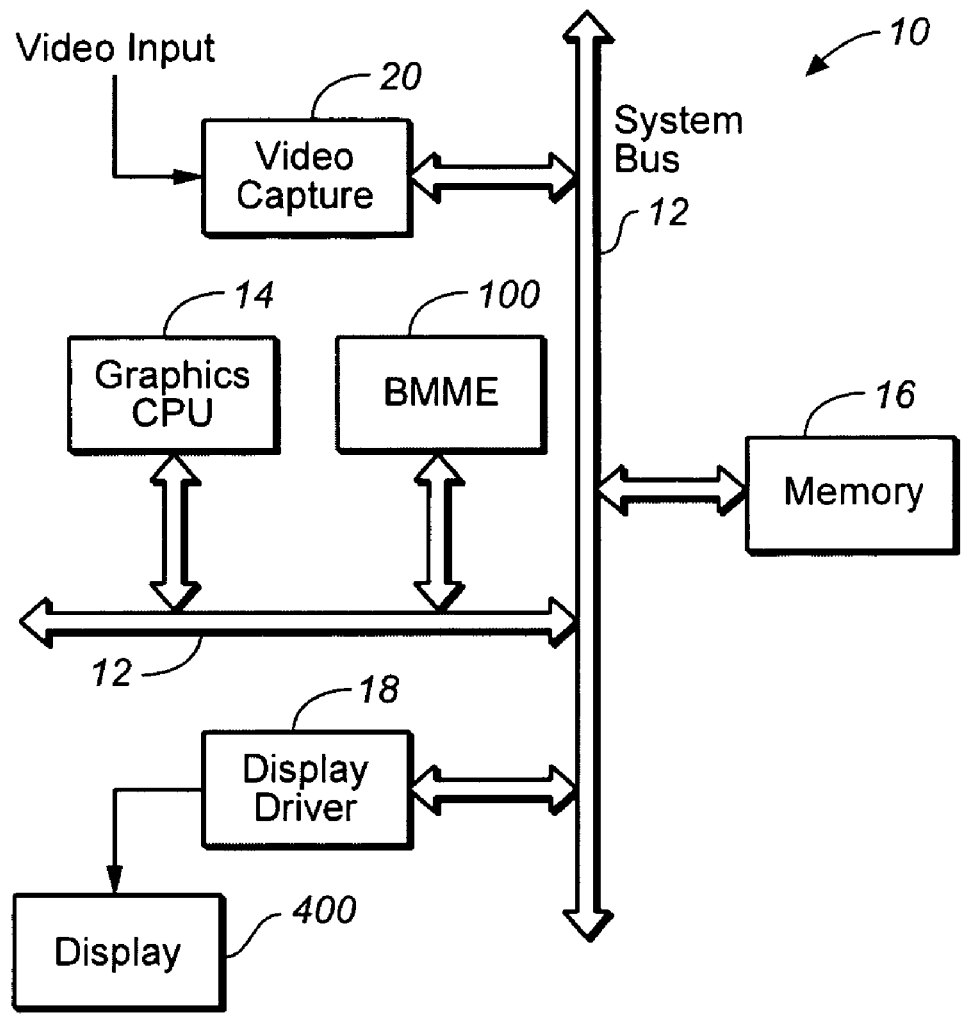
FIG. 1 is a block diagram of a combined video and graphics processing system.

Referring to FIG. 1, a combined video and graphics processing system 10 is shown. The system 10 generally implements a bus 12 accessed by a graphics CPU 14 and a data processor 100. In one example, the data processor 100 may be implemented as a block move engine (BME). In another example, the data processor 100 may be implemented as a block modify and move engine (BMME) 100. The BMME 100 may be configured to read data from and write data to the memory 16 via the bus 12. A video capture block 20 may also interface with the memory 16 via the bus 12. The memory 16 may also be common to the graphics CPU 14. The processing system 10 may also have a display driver 18 for driving a display 400 (e.g., a video display unit (VDU)).

The graphics CPU 14 may be configured to draw graphics objects within the system memory 16. The video capture block 20 may be configured to write moving video or individual stills to the system memory 16. The BMME 100 may be configured to read any graphics or video objects from the memory 16. The BMME 100 may also be configured to manipulate and combine (e.g., composite) the objects and write the result back to the memory 16.

Figure 2:
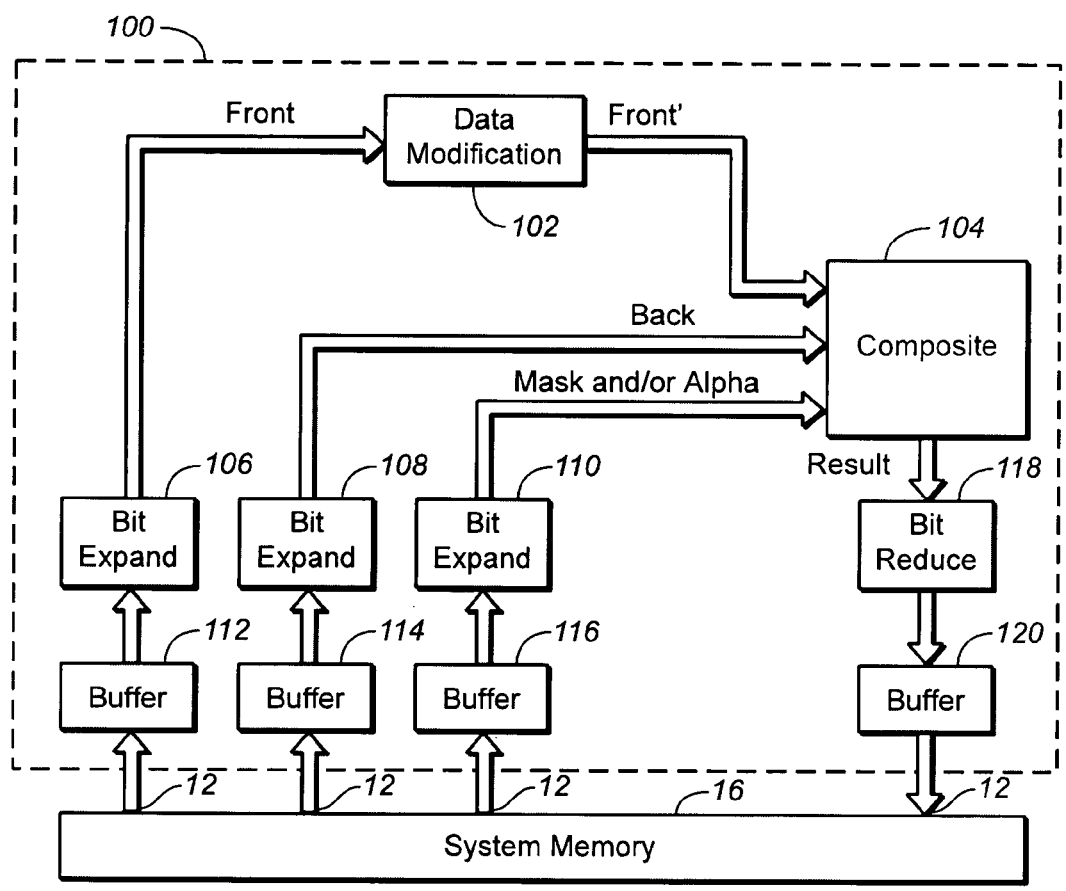
FIG. 2 is a block diagram of a BME of FIG. 1.

Referring to FIG. 2, a detailed block diagram of the BMME 100 is shown. The BMME 100 may have direct read/write access to data in the system memory 16 via the bus 12. Data in the system memory 16 may be stored in any format suitable for graphics or still images. Such data formats include bitmaps, color look-up table (CLUT) idiocies, YUV (with or without alpha), RGB (with or without alpha) and alpha planes. Video data formats typically, however, not necessarily, comprise Y, Cb and Cr samples which may be stored interleaved or in separate "frame stores". The sampling structure for the chrominance components may be similar to the luminance components or there may be fewer samples either horizontally or vertically. However, other appropriate data formats may be implemented in order to meet the design criteria of a particular implementation.

The BMME 100 generally comprises a data modification block (or circuit) 102, a composite block (or circuit) 104, a bit expansion block (or circuit) 106, a bit expansion block (or circuit) 108, a bit expansion block (or circuit) 110, a buffer 112, a buffer 114, a buffer 116, a bit reduce block (or circuit) 118 and a buffer 120. The buffers 112, 114 and 116 may directly interface with the system memory 16 via the bus 12. The buffers 112, 114 and 116 may be coupled to the bit expand circuits 106, 108 and 110, respectively. The bit expand circuit 106 may generate a signal (e.g., FRONT) that may be presented to the data modification circuit 102. The bit expand circuit 108 may generate a signal (e.g., BACK) that may be presented to the composite block 104. The bit expand circuit 110 may generate one or more signals (e.g., MASK and/or ALPHA).

The data modification circuit 102 may generate a signal (e.g., FRONT') in response to the signal FRONT. The signal FRONT' may be presented to the composite block 104. The composite block 104 may generate a signal (e.g., RESULT) in response to the signals FRONT', BACK, MASK and/or ALPHA. The signal RESULT may be presented to the bit reduce circuit 118. An output of the bit reduce circuit 118 may be presented to the buffer 120. The buffer 120 may be configured to interface with the memory 16 via the bus 12.

The data stream FRONT may be data which represents the graphic or video foreground. The data stream BACK may be data which represents the graphic or video background. The data stream MASK and/or ALPHA may control the switching of the picture between foreground and background. The bit expand blocks 106, 108 and 110 may be configured to generate the signals FRONT, BACK, MASK and/or ALPHA in response to data from the system memory 16. The BMME 100 may provide an output to the system memory 16 via the bit reduce block 118 and the buffer 120.

The BMME 100 may operate on regions of data stored in the memory 16 which may be in graphics or video data formats. The buffers on the input data paths (e.g., 112, 114, 116) and the output data paths (e.g., 120) of the BMME 100 may incorporate memory address generators to ensure that data is read from or written to the system memory 16 in the desired order. Furthermore, the BMME 100 may not have to scan data in the system memory 16 as a raster scan (e.g., starting from the top left of a region). Scanning may proceed in any direction. The region covered may not need to be rectangular, if the address generators in the buffers 112, 114, 116, and 120 are sufficiently programmable to allow regions of other shapes (e.g., triangular, etc.). In addition, the directions in which the memory 16 is read from and written to by the BMME 100 may differ for various data paths through the BMME 100. Therefore, the BMME 100 may provide the effect of reversing one or more objects left to right or top to bottom before compositing within the composite 104.

The bit expand blocks 106, 108 and 110 may be optionally implemented to expand source data read from the system memory 16 to a common format, when necessary. The bit expand blocks 106, 108 and 110 may enable the data to be combined easily in the composite block 104. In a first example, data in a 16-bit RGB format (e.g., RGB565) may be expanded to 24-bit RGB format (e.g., RGB888) by adding extra LSBs to each color component of the data. In a second example, CLUT index format data may be expanded to a true-color format by alternatively introducing constant "fill" colors on any data input in the bit expand blocks 106, 108 and 110.

In addition to being modified in the bit expand block 106 the data FRONT may be modified in the data modification block 102 to ensure a format which matches the data BACK and the output data RESULT. The data modification block 102 may perform data modification that may comprise:

performing conversion between video and graphics formats, including changes to the luminance/chrominance sampling structure;

combining (e.g., interleaving) (or separating) particular color components;

scaling and/or filtering of the image, if a size or image bandwidth mismatch;

changing the color space (RGB<=>YUV);

making gain and/or level adjustment to the color components; and/or performing gamma correction.

The modified data FRONT' may then combine with the data BACK within the composite circuit 104 to generate the image data RESULT. The composite block 104 may be configured to perform bitwise logical operations and/or alpha blending. The composite block 104 may be controlled by the value MASK, the value ALPHA or a "transparency-awareness" value derived from the data value FRONT.

The bit reduce block 118 may provide a way of reducing the number of bits per pixel in the output data RESULT. The bit reduce circuit 118 may reduce a common format generated by the composite block 104 to a smaller format, when necessary (e.g., for storage in the system memory 16).

Figure 3:
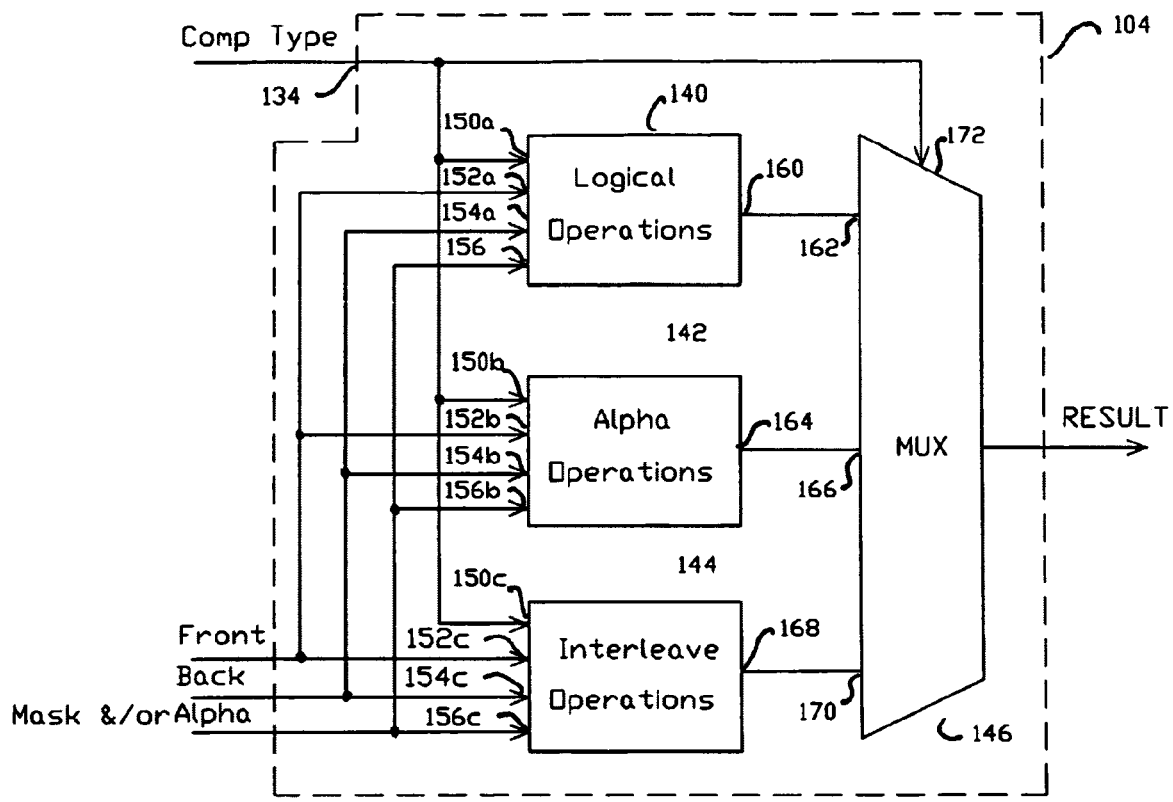
FIG. 3 is a detailed block diagram of a composite circuit of FIG. 2.

Referring to FIG. 3, a detailed block diagram of the composite circuit 104 is shown. The circuit 104 generally comprises a circuit 140, a circuit 142, a circuit 144 and a circuit 146. The circuit 140 may be implemented as a logical operations circuit (block). The circuit 142 may be implemented as an alpha operations circuit (block). The circuit 144 may be implemented as an interleave operations circuit (block). The circuit 146 may be implemented as a multiplexer.

The composite circuit 104 may have an input 134 that may receive a signal (e.g., COMPTYPE). The signal COMPTYPE may be externally generated and written to a BMME control register by a CPU (both of which are not shown). The signal COMPTYPE may control the type of data combination operation carried out by the composite block 104. The various signals of the present invention may be implemented as multi-bit or single bit signals or busses.

The circuit 140 may have an input 150a that may receive the signal COMPTYPE, an input 152a that may receive the signal FRONT', an input 154a that may receive the signal BACK and an input 156a that may receive the signals MASK and/or ALPHA. Similarly, the circuits 142 and 144 may have, respectively, inputs 150b and 150c that may receive the signal COMPTYPE, inputs 152b and 152c that may receive the signal FRONT', inputs 154b and 154c that may receive the signal BACK and inputs 156b and 156c that may receive the signals MASK and/or ALPHA.

The circuit 140 may have an output 160 connected to an input 162 of the multiplexer 146. The circuit 142 may have an output 164 connected to an input 166 of the multiplexer 146. The circuit 144 may have an output 168 connected to an input 170 of the multiplexer 146. The multiplexer 146 may have an input 172 that may receive the signal COMPTYPE. The multiplexer 146 may present a signal received from the circuit 140, the circuit 142 or the circuit 144 as the signal RESULT in response to the signal COMPTYPE.

The logical operations block 140 of the composite block 104 may implement logical bitwise operations such as:

RESULT=FRONT' XOR BACK

RESULT=(MASK AND FRONT') OR ((NOT MASK) AND BACK).

The alpha operations block 142 of the composite circuit 104 may perform alpha-blending equations such as:

RESULT=(ALPHA*FRONT')+((1-ALPHA) *BACK)).

The interleave operations block 144 of the composite circuit 104 generally comprises multiplexers and bit shifters (not shown). The interleave operations block 144 may perform (but is not limited to) the following operations:

(i) take data from the signal FRONT' and pass the data unchanged the signal RESULT, (the data may be chroma (U, V) pairs, or YUV, RGB, αYUV or αRGB pixels);

(ii) take chroma-only (U, V) data from the signal FRONT' and Y data from the signal BACK and combine the data to make up 24-bpp YUV values in the signal RESULT; and/or (iii) take chroma-only (U, V) data from the signal FRONT', Y data from the signal BACK and alpha data from the signal ALPHA and combine the data to make up 32-bpp αYUV values in the signal RESULT.

Example operations of the interleave operations block 144 are shown in the following TABLES 1a and 1b.

TABLE 1a

| Conversion | Front' | | | | Back | | | |
|---|---|---|---|---|---|---|---|---|
| | 31:24 | 23:16 | 15:8 | 7:0 | 31:24 | 23:16 | 15:8 | 7:0 |
| 4:2:0 to 4:4:4 | U | V | U | V | — | — | — | — |
| 4:2:2 to 4:4:4 | U | V | U | V | — | — | — | — |
| 4:4:4 to YUV | — | — | U | V | — | — | — | Y |
| 4:4:4 to RGB | — | R | G | B | — | — | — | — |
| 4:4:4 + alpha to αYUV | — | — | U | V | — | — | — | Y |
| αYUV to αRGB | A | R | G | B | — | — | — | — |

TABLE 1b

| Conversion | Mask/Alpha | | | | Result | | | |
|---|---|---|---|---|---|---|---|---|
| | 31:24 | 23:16 | 15:8 | 7:0 | 31:24 | 23:16 | 15:8 | 7:0 |
| 4:2:0 to 4:4:4 | — | — | — | — | U | V | U | V |
| 4:2:2 to 4:4:4 | — | — | — | — | U | V | U | V |
| 4:4:4 to YUV | — | — | — | — | — | Y | U | V |
| 4:4:4 to RGB | — | — | — | — | — | R | G | B |
| 4:4:4 + alpha to αYUV | — | — | — | A | A | Y | U | V |
| αYUV to αRGB | — | — | — | — | A | R | G | B |

The entries in the TABLE 1a and the TABLE 1b may relate to the conversion operations of the interleave circuit 144 of the composite circuit 104. Input and output signals (e.g., the signal FRONT', the signal BACK, the signal MASK and/or ALPHA and the signal RESULT) may be 32-bits wide. Any color or alpha component signal (e.g., RGB or alpha) may be 8-bits wide. However, other appropriate bit widths may be implemented to meet the criteria of a particular implementation. Additionally, some input bits may not be used in one or more conversion operations. Such unused bits may be omitted when applicable.

Although the BMME 100 illustrates a data modification block 102 in the data path FRONT, similar data modification functions may be included in data paths BACK, MASK and/or ALPHA. The BMME 100 may be configured to read any graphics or video objects. The BMME 100 may also be configured to manipulate and combine video objects. The BMME 100 may be configured to write the results back to a system memory.

While the invention has been particularly shown and described with reference to the preferred embodiments thereof, it will be understood by those skilled in the art that various changes in form and details may be made without departing from the spirit and scope of the invention.

What is claimed is:

1. An apparatus comprising:
    a bus;
    a first data modification circuit configured to generate a first output data stream in response to performing a first modification on at least one first image from a first input data stream received from said bus; and
    a composite circuit configured to generate a combined output data stream on said bus in response to performing a spatial combination of said first output data stream and a second output data stream, wherein (i) said spatial combination is a bitwise logical operation on said first output data stream and said second output data stream and (ii) said bitwise logical operation comprises a one of the following (i) an exclusive OR operation, (ii) an OR operation, and (iii) a combination of AND operations and multiplication operations.

2. The apparatus according to claim 1, wherein said apparatus forms a block modify and move engine.

3. The apparatus according to claim 1, further comprising:
    a second data modification circuit configured to generate said second output data stream in response to performing a second modification on at least one second image from a second input data stream.

4. The apparatus according to claim 1, wherein said first data modification circuit is further configured to convert an input format of said first input data stream and an output format of said first output data stream between a video data format and a graphics data format.

5. The apparatus according to claim 1, wherein (i) said first output data stream comprises a plurality of video pictures, (ii) said second output data stream comprises a graphics data and (iii) said spatial combination places said video pictures in front of said graphics data.

6. The apparatus according to claim 1, wherein said first data modification circuit is further configured to perform interleaving of color components in each of said first images.

7. The apparatus according to claim 1, wherein said first data modification circuit is further configured to perform separation of color components in each of said first images.

8. The apparatus according to claim 1, wherein said first data modification circuit is further configured to perform scaling on each of said first images.

9. The apparatus according to claim 1, wherein said first data modification circuit is further configured to perform filtering on each of said first images.

10. The apparatus according to claim 1, wherein said spatial combination is an alpha blending on said first output data stream and said second output data stream.

11. The apparatus according to claim 1, further comprising;
    a memory configured to buffer a first data having a first format, a second data having a second format and a third data;
    a first expander circuit configured to generate said first input data stream having a particular format from said first data;
    a second expander circuit configured to generate said second output data stream having said particular format from said second data; and
    a third expander circuit configured to generate a control signal for said spatial combination from said third data.

12. A method for processing a plurality of data streams, comprising the steps of:
    (A) reading a first input data stream of said data streams from a memory;
    (B) modifying at least one image from said first input data stream to generate a first output data stream of said data streams;
    (C) spatially combining said first output data stream and a second output data stream of said data streams to generate a combined output data stream, wherein (i) said spatial combination is a bitwise logical operation on said first output data stream and said second output data stream and (ii) said bitwise logical operation comprises a one of the following (i) an exclusive OR operation, (ii) an OR operation, and (iii) a combination of AND operations and multiplication operations; and
    (D) writing said combined output data stream to said memory.

13. The method according to claim 12, wherein step (B) further comprises the sub-step of:

converting an input format of said first input data stream and an output format of said first output data stream between a video data format and a graphics data format.

14. The method according to claim 12, wherein (i) said first output data stream comprises graphics data, (ii) said second output data stream comprises a plurality of video pictures and (iii) said step (C) further comprises the sub-step of:

spatially placing said graphics data in front of said video pictures.

15. The method according to claim 12, wherein step (B) further comprises the sub-step of:

interleaving of color components in each of said images.

16. The method according to claim 12, wherein step (B) further comprises the sub-step of:

separating of color components in each of said images.

17. The method according to claim 12, wherein step (B) comprises the sub-steps of;

scaling each of said images; and
filtering each of said images.

18. The method according to claim 12, wherein step (C) comprises the sub-step of:

performing alpha blending on said first output data stream and said second output data stream.

19. An apparatus comprising;

means for storing;

means for generating a first output data stream by modifying at least one image from a first input data stream read from said means for storing;

means for generating a combined output data stream by spatially combining said first output data stream and a second output data stream read from said means for storing, wherein (i) said spatial combination is a bitwise logical operation on said first output data stream and said second output data stream and (ii) said bitwise logical operation comprises one of the following (i) an exclusive OR operation, (ii) an OR operation, and (iii) a combination of AND operations and multiplication operations; and means for writing said combined output data stream to said means for storing.

* * * * *